United States Patent [19]

Bryer et al.

[11] Patent Number: 4,780,757

[45] Date of Patent: Oct. 25, 1988

[54] TELECOMMUNICATION SYSTEM WITH FRAME SELECTED CONTINUOUS AUDIO SIGNALS

[75] Inventors: Steven M. Bryer, Natick; William C. Purple, Sharon; Walter J. Beriont, Natick, all of Mass.

[73] Assignee: GTE Government Systems Corporation, Waltham, Mass.

[21] Appl. No.: 166,064

[22] Filed: Mar. 9, 1988

Related U.S. Application Data

[63] Continuation-in-part of Ser. No. 44,395, Apr. 30, 1987, abandoned.

[51] Int. Cl.$^4$ .............................................. H04N 7/10
[52] U.S. Cl. ...................................... 358/86; 358/143
[58] Field of Search ................... 358/85, 86, 143, 144, 358/145; 379/53; 455/4

[56] References Cited

U.S. PATENT DOCUMENTS

| | | | |
|---|---|---|---|
| 3,493,674 | 2/1970 | Houghton | 178/6.8 |
| 3,746,780 | 7/1973 | Stetten et al. | 178/6.6 A |
| 4,500,751 | 2/1985 | Darland et al. | 179/2 DP |
| 4,578,535 | 3/1986 | Simmons | 179/2 DP |
| 4,616,263 | 10/1986 | Eichelberger | 358/185 |
| 4,698,670 | 10/1987 | Matty | 358/86 |
| 4,734,764 | 3/1988 | Pocock et al. | 358/86 |

FOREIGN PATENT DOCUMENTS 62-49733 4/1987 Japan ..................................... 358/86

2174874 11/1986 United Kingdom ................. 358/86

OTHER PUBLICATIONS

NHK (Japan Broadcasting Corporation) "Present Status of Still-Picture Television"; May 1978.

Berg, "Dialoog TV; Kabelexperiment Zuid-Limburg", I$^2$-Elektrotechniek/Elektronica-No. 4-1986, pp. 35-39.

Primary Examiner—Keith E. George
Attorney, Agent, or Firm—J. Stephen Yeo

[57] ABSTRACT

A telecommunication system has a facility and an addressable terminal coupled through a transmission medium. The facility includes means for providing addressed video frames containing information corresponding to still images and for providing addressed audio frames containing information corresponding to audio bursts. There is also provided for non-addressed signals containing information corresponding to at least two channels of continuous audio. A selection code is inserted in one or more of the frames. The addressed video and audio frames and non-addressed signals are coupled to the transmission medium to the addressable terminal. The terminal has means for detecting said addressed video frames, addressed audio frames, and non-addressed signals. Circuits select video frames and audio frames in response to their corresponding addresses. One of said continuous audio channels is selected in response to said selection code.

4 Claims, 5 Drawing Sheets

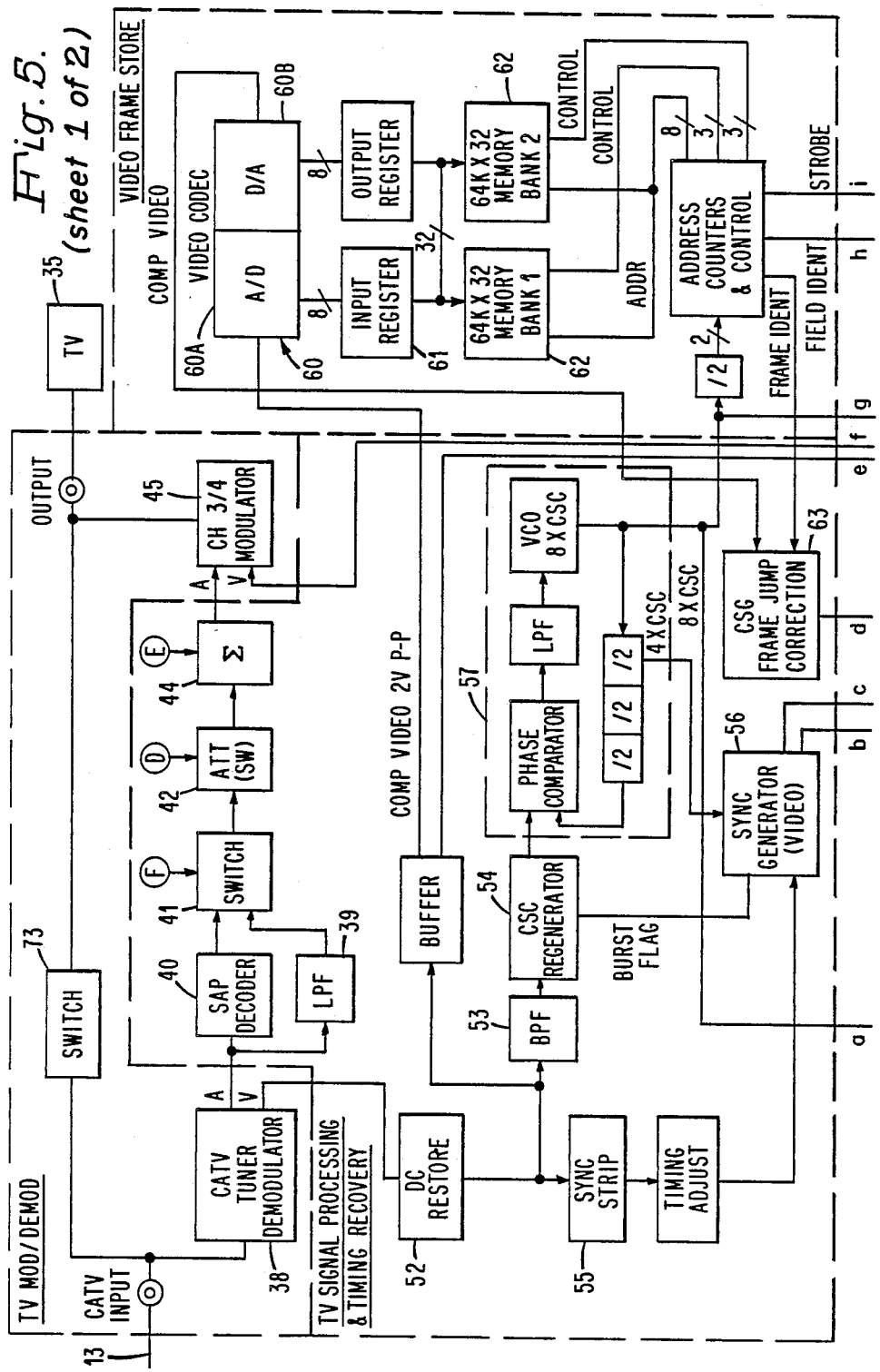
Fig. 5. (sheet 1 of 2)

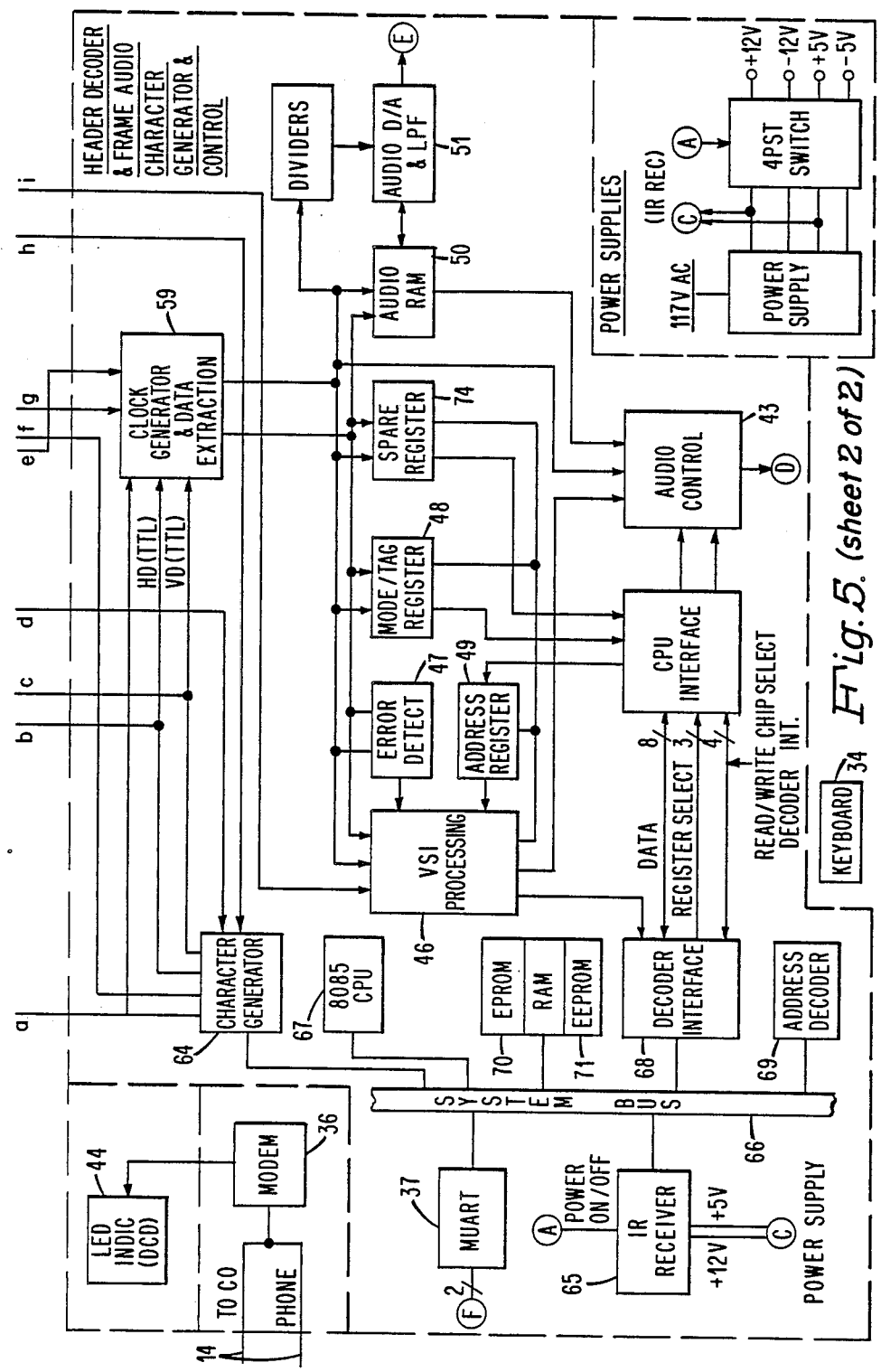
Fig. 5. (sheet 2 of 2)

TELECOMMUNICATION SYSTEM WITH FRAME SELECTED CONTINUOUS AUDIO SIGNALS

RELATED APPLICATIONS

This is a continuation-in-part of Ser. No. 044,395 filed Apr. 30, 1987 now abandoned. The following applications, filed simultaneously with the parent of this application, pertain to different features of the telecommunication systems.

Ser. No. 044,393, Telecommunication System With Audio Frames is concerned with addressed still frame video and time-compressed audio frames.

Ser. No. 044,388, Telecommunication System With Burst and Continuous Audio Signals, now abandoned discusses attenuating a continuous background channel when burst audio is played.

Ser. No. 044,394, Telecommunication System With Selectable Audio Channels now abandoned, describes a system having two or more continuous audio signals sent on a first transmission medium and selected in response to a signal sent on a second transmission medium.

Ser. No. 044,387, System for Synchronizing Digital Bit Stream for Telecommunication System discloses use of data clock pulses derived from color burst to sync data with flag bit.

Incorporation by Reference

U.S. Pat. No. 3,746,780 is hereby incorporated by reference.

BACKGROUND OF THE INVENTION

This invention pertains to telecommunications and, more particularly, is concerned with interactive telecommunication systems.

A number of telecommunication systems have been suggested and deployed which allow a terminal user to request particular video information from a remote repository. Services possible with such systems include, but are not limited to, information searches, retrievals, financial transactions, reservations, and shopping.

With some systems, both the user requests and the video information are sent on a single duplex medium such as telephone lines. Examples of such single medium systems are described in U.S. Pat. Nos. 4,500,751 and 4,578,535.

In other systems, requests are sent over telephone lines and the video information is sent over a broader bandwidth medium, such as cable. Examples of such dual media systems are the subjects of U.S. Pat. Nos. 3,746,780 and 4,616,263, and described in I2- Elektrotechniek/Elektronica No. 4-1986, pp. 35-39.

With the system of the aforecited U.S. Pat. No. 3,746,780, a user wanting a service telephones a code number to a central facility. At the central facility, the selected video information is recovered from video discs or other storage means and sent as still television frames to the user over cable or other media. As many terminals are usually coupled to the same medium, each still frame contains a location number or address which is read by address detectors located at the terminals. Only those frames with the same address as the terminal are accepted. An accepted frame may be digitally stored by the terminal and repetitively displayed on a conventional television receiver.

Examples of video information include menus, forms, data, text, and still pictures. It is desirable but lacking in the described system to have audio information such as music and voice accompany the video.

In a publication dated May 1978, NHK (the Japan Broadcasting Corporation) there is described a system for sending still pictures with accompanying program sound. Frames for a number of programs are time multiplexed. Each video frame has a code identifying the program to which it belongs. The sound signals of all the programs are digitally encoded and time divisionally multiplexed on lines within an audio frame. Both the video and audio frames are in the standard NTSC format. The video frames are sent serially with each video frame followed by two audio frames. Each video frame carries analog video information corresponding to one program, while each audio frame carries digitized audio information corresponding to all programs.

A receiver seizes and records video frames of a selected program for repetitive display. The analog video may be digitized and stored in a solid state memory while apparently the audio is converted to analog and played as received. The NHK system is appropriate for broadcasting a plurality of predetermined programs, but it is not optimal for interactive broadband services where many users can initiate and interact with programs or services at different times.

SUMMARY OF THE INVENTION

Briefly, according to one aspect of the invention, a telecommunication system comprises a facility and an addressable terminal coupled through a transmission medium. The facility includes means for providing addressed video frames containing information corresponding to still images and for providing addressed audio frames containing information corresponding to audio bursts. There is also means for providing non-addressed signals containing information corresponding to a least two channels of continuous audio. A selection code is inserted in one or more of the frames. The addressed video and audio frames and non-addressed signals are coupled to the transmission medium to the addressable terminal. The terminal has means for detecting said addressed video frame, addressed audio frames, and non-addressed signals. Circuits select video frames and audio frames in response to their corresponding addresses. One of said continuous audio channels is selected in response to said selection code. The selected continuous audio channel is played concurrently with a still image.

BRIEF DESCRIPTION OF THE DRAWINGS

FIG. 5 is a block diagram of a Terminal used in the system of FIG. 1.

DESCRIPTION OF INVENTION

Figure 1:
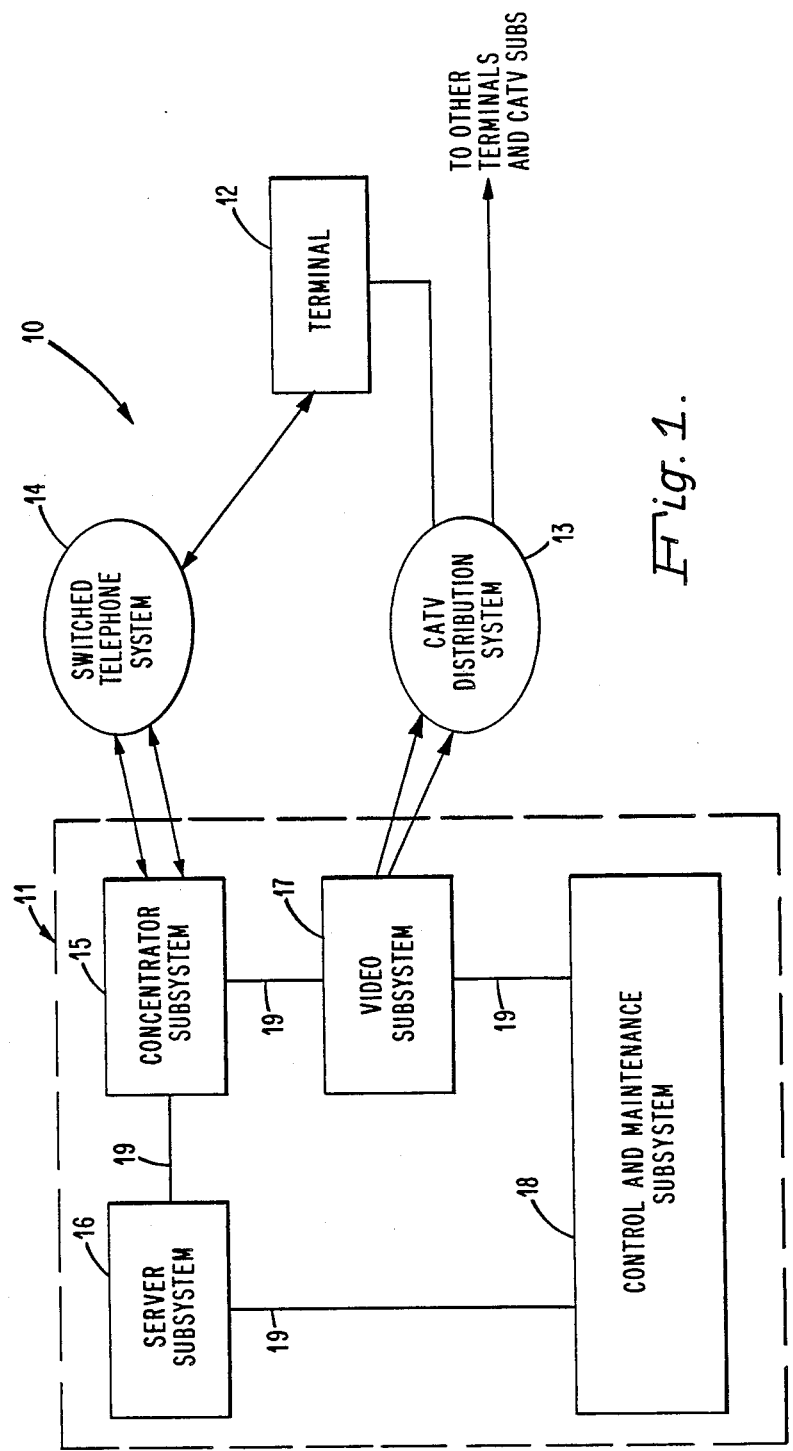
FIG. 1 is a schematic diagram of a telecommunication system embodying the system.

A telecommunication system 10 embodying the invention is shown in FIG. 1. A Central Facility 11 is coupled to a plurality of terminals 12 through a first transmission medium 13 having a bandwidth sufficient to carry standard television frames. First transmission medium 13 may be cable, such as a CATV network. Optical fiber, air, and other wideband media are also suitable. The Central Facility 11 and terminals 12 are also coupled by a second transmission medium 14 allowing duplex transmission of control signals not requiring a large bandwidth. The local switched telephone system is a satisfactory second transmission medium, allowing low bit rate signals to be sent between the facility and a specific terminal. Alternatively, the low bit rate signals can be transmitted over the aforementioned broadband medium 13.

Central Facility 11 provides both video and audio information in response to subscribers' requests. The video information represents still frames of text, pictures, or other images sent as a series of addressed video frames. Each still frame may be displayed for several seconds on a television set or monitor connected to the terminal, during which time it is desirable to provide audio to accompany the video.

The system preferably has two types of audio: continuous and specific, both of which may be played simultaneously. Continuous audio is sent on a real time basis on, for example, audio channels. An example of continuous audio is background music. Specific audio is so called because it is specific to the displayed still frame. Typical specific audio is voiced narrative or instructions. Specific audio is intended for only certain selected terminals at a time and is sent in time-compressed bursts by addressed frames having the same address as the accompanying video frame. Only one channel of time-compressed audio is carried in an audio frame.

Both audio frames and video frames are in the same television format, such as the NTSC system. The same principle is directly applicable to other television systems like PAL or SECAM.

In the NTSC system, each frame is 1/30 second long and consists of two fields with 262.5 horizontal lines each. The lines of two fields are interlaced for a total of 525 lines per frame. Approximately 21 lines occur during a period called the vertical blanking interval (VBI) which is at least 1.33 mS long. These lines do not appear on the television screen, leaving about 483 lines of video in a frame.

The NTSC system is described briefly in "Federal Communication Commission, Public Notices" of Dec. 17, 1953 and June 6, 1954.

When the NTSC standard was written, a minimum VBI of 1.33 mS was necessary to allow the scan to return to the top of the picture tube between fields. Schemes for sending auxiliary information during one or more lines of VBI have been developed such as described in U.S. Pat. No. 3,493,674 and in North American Broadcast Teletext, Specification-Engineering and Development Department, CBS Television, Newark, N.J., June 22, 1981.

In keeping with the present invention, addresses, mode codes, continuous audio channel selection code and error detection/correction codes are sent on one line, e.g. Line 12 during the VBI of both the video and the audio frames. The structure of this line is such that the first eight bits always represent the mode code and the tag sequence number, the next 24 bits always represent the address and the next eight bits represent the continuous audio channel selection code. The address alerts an addressed terminal that a correspondingly addressed frame is to be accepted. The mode code identifies the frame as either video or audio, and its sequence with other frames so that the terminal can process it accordingly.

The audio frame information, which may be digital or analog, is sent in time-compressed bursts, allowing one or more seconds of audio to be carried by each 1/30 second frame. The terminal stores the time-compressed audio frame and plays it at normal speed through a television receiver.

The Central Facility 11 consists of four basic subsystems: a Concentrator Subsystem 15, a Server Subsystem 16, a Video Subsystem 17, and Control and Maintenance Subsystem 18.

Each of the subsystems may be implemented on a commercially available general purpose computer, with the interconnections being provided by a Local Area Network (LAN) 19. The software of each of these subsystems may be designed as a self-contained entity, with the inter-subsystem interfaces conforming to a standard inter-processor protocol. This allows for a complete Central Facility system configuration where each subsystem consists of a separate processor or group of processors. However, in smaller configurations, one or more of these subsystems may be implemented on a single computer while still maintaining the software interfaces that allows simple expansion to multi-computer configurations.

The Control and Maintenance Subsystem 18 provides the administration for the Central Facility 11 and is also responsible for the gathering of statistics on the workings of the overall system. The Control and Maintenance Subsystem 18 is not necessary to practice the present invention and will not be discussed further.

The Concentrator Subsystem 15 is the interface to the terminals for all control and communication purposes. It is accessed by a remote terminal on the second transmission medium 14 which may be a dial-up connection through the public telephone network, or an RS232C direct terminal access interface for high usage control terminal activities.

The Server Subsystem 16 acts as the overall controller of a session using input from the Terminal 12, via the Concentrator Subsystem 15, to access the appropriate databases and to send instructions back to the Concentrator Subsystem 15 as to which video and audio frames to send to the user.

Figure 2:
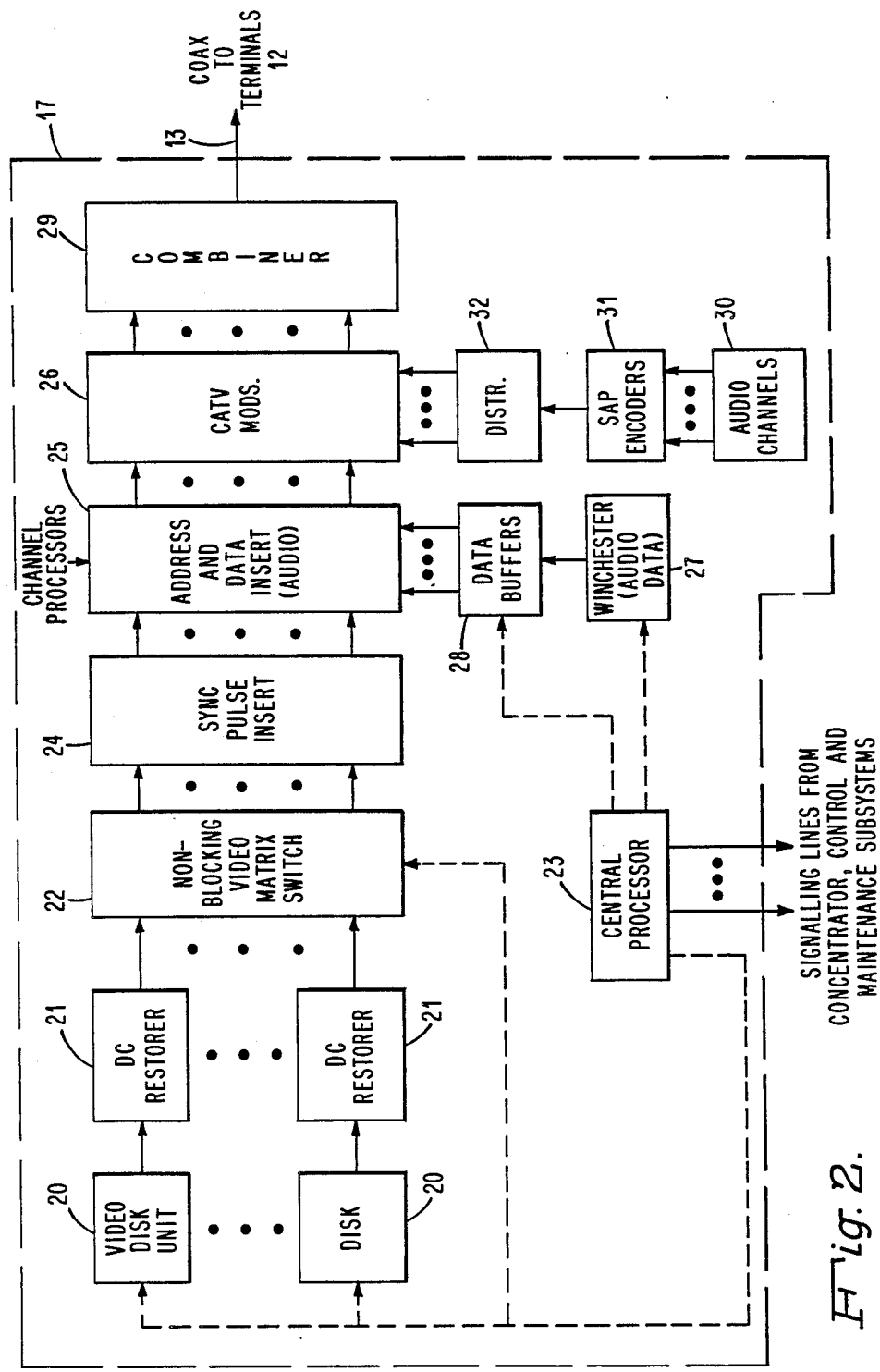
FIG. 2 shows in more detail a video server subsystem of the Central Facility seen in FIG. 1.

The Video Subsystem 17 which is seen separately in FIG. 2 stores and sends to the terminals 12 via the CATV link 13 video and encoded audio information frames. Video still frames are stored in optical Video Disk Units 20 in standard NTSC composite baseband format. About 54000 still frames can be stored on each disc.

Since the seek time of the video disc units is longer than desired, many more than the minimum number of video disc units to accommodate all the still frames is needed. The video disc units 20 provide ac coupled signals, so a dc restorer 21 is needed to precede a nonblocking video matrix switch 22.

If the user calls for a video still frame, a central processor 23 identifies its location on an available video disc unit. After the unit has reached the requested still frame, it advises switch 22 which then switches one frame into a pulse insertion device 24. The pulses inserted come directly from the station sync master. The frame is then connected into a channel processor 25 which inserts addressing, mode code and error codes on a VBI line. The addressed frame is connected into the video input of a CATV modulator 26.

Audio frames (of which more than one may be associated with a particular video frame) are previously digitally stored on Winchester-type magnetic discs 27 in a 8-bit PCM encoded format at a sampling rate of 16 KHz for example. A disc drive unit which can accommodate about 1 Gbyte will accommodate about 1000 minutes of audio at 124 kb/s.

It is also possible to store time-compressed audio in analog format to be transmitted as an analog signal.

In order to store as much audio as possible on each frame, the audio is compressed. One or more seconds of real time audio are sent on each 1/30 second frame, depending upon the type of compression.

Central processor 23 identifies those audio frames to accompany a selected video frame and unloads them from the correct addresses in a Winchester disc 26 into a buffer memory 28. After the transfer has been completed, the Central processor 23 calls for a corresponding number of black frames via the switch to accommodate the audio data. These black frames include color bursts for clock recovery in the terminal. Each active line is at black level. In the NTSC system, black is represented by a low signal level. The data is inserted by the channel processor 25. The data bits are converted to pulses which are first conditioned by a Nyquist filter to reduce inter-symbol interference, as well as to prevent interference on the sound channel and the spreading of energy on adjacent channels before they are summed onto the black frame raster.

A transmission bit rate of 8/5 of the color subcarrier frequency 3.579545 MHz (5.727272 Mb/sec) may be used. The data clock has a period of 174.6 nanoseconds. While this is the same bit rate as Teletext, which is approximately the fastest bit rate which can be carried by most CATV systems, the preferred formatting of the data and the method of clocking the incoming data are much more efficient and significantly different.

Figure 4:
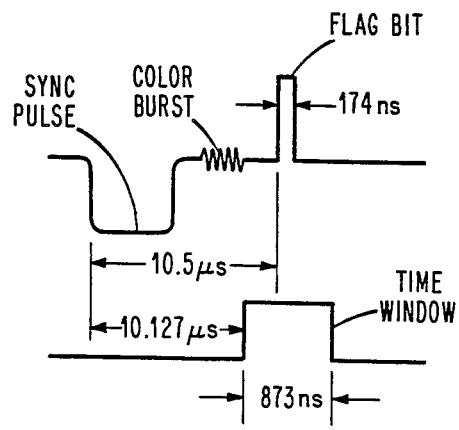
FIG. 4 illustrates waveforms on a bit synchronization system.

Turning briefly to FIG. 4, on each line on which there is data, a flag bit in the form of a "1" bit is placed, for example, 10.5 microseconds (60 data clock pulses) after the leading edge of the horizontal synchronization pulse. It is then followed by 288 bits (i.e., 36 bytes) of data. For the audio data, this results in total of 142272 bits/frame.

Figure 3:
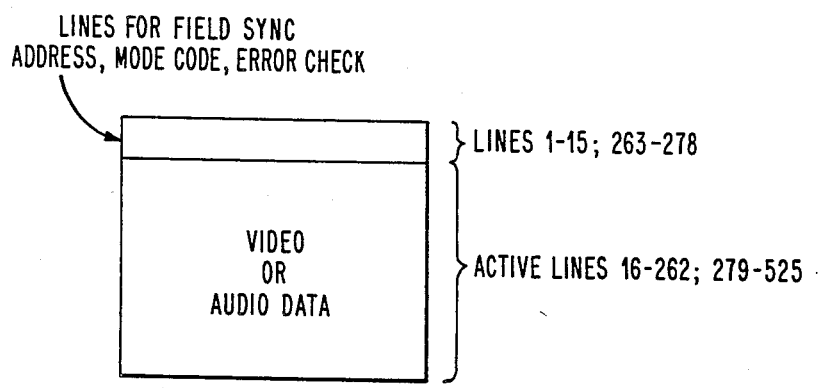
FIG. 3 represents video and audio frames used to carry information from the Central Facility to Terminal.

Referring to FIG. 3, in both audio and video frames four lines within the vertical blanking interval are reserved for addressing and mode (video or audio) and error codes, and future use. In audio frames, line 16 to 262 on field one and line 279 to line 525 on field two are used for the audio data.

Referring again to FIG. 2, the black frame with the audio data is switched for the period of one frame (approx. 1/30 second) into the video input of a CATV modulator 26. The video frames are also passed on to the video input of the CATV channel modulator 26. There is always a continuous stream of still frames with black burst frames being switched in when no information frames are delivered. Each channel modulator is selected for transmission through a single coaxial distribution system and a single coaxial cable system 13. With a set of projected traffic patterns, there might typically be over 100 active users sharing one channel. Video and audio frames of a program are time multiplexed with others on a CATV video channel and sent to remote terminals. Continuous audio is sent on an audio channel.

Central Facility 11 employs the BTSC multichannel television sound format to place continuous audio (e.g., background music) in up to three separate audio channels 30 in the NTSC composite signal. A SAP (second audio program) channel is used. Three possible channels are the monaural (left plus right), the stereo difference channel, and the SAP channels. It is also possible to make available many more distinctly different background music channels to the user.

Both the continuous audio and the framed specific audio described above may occur simultaneously. When the video specific audio is played out in real time at the user terminal, the continuous audio component, if present, is attenuated automatically. The central processor 23 controls the selection of the continuous audio channel (or silence) at the user's terminal through control signals, called continuous audio channel selection code, inserted by the channel processor 25 into line 12 of the vertical blanking interval signals sent over the telephone loop 14 by Concentration. The user may also have the capability of muting it. The continuous audio sources are connected into the audio input of the same modulator 26.

The audio inputs of the channel modulators 26 can be driven either from individual SAP channel encoders 31 or can all be driven from a single encoder using a suitable distribution unit 32.

The video and audio frames, as well as the continuous audio, are distributed through the CATV network 13 to the terminals.

Turning now to FIG. 5, a terminal 12 consists of a set-top module 33 and a remote keypad 34.

A connector panel (not shown) on the set-top module provides various physical connectors, including:
Cable in—75 ohm coaxial F-connector
TV out—75 ohm coaxial F-connector
Telephone line—RJ-11 telephone jack
Auxiliary phone—RJ-11 telephone jack.

Through these connectors, the terminal 12 is coupled to a CATV channl 13, telephone loop 14 and a television receiver or monitor 35.

Set-top module 33 contains hardware and software for data communications to and from the Central Facility 11 and for receiving and processing video frames and audio frames sent from the Central Facility and delivering them to the television receiver 35. The set-top module also contains a power supply, and a controllable modem 36 as the interface to the telephone loop 14.

CATV tuner demodulator 38 receives a selected NTSC channel signal over the CATV network. This composite signal contains video frames, digitally encoded audio frames, and BTSC encoded audio channels. CATV tuner demodulator 38 demodulates the incoming signal to baseband and splits the continuous audio channels from the video and audio frames.

The continuous audio channels extracted from the audio output of CATV tuner demodulator 38 are separated by a low-pass filter 39 and a SAP channel decoder 40. They are connected into an analog switch 41, which is controlled by the continuous audio selection code sent from the Central Facility 11 sent on the vertical blanking interval of a frame. The selection code, once stripped from its frame controls switch 41 to select the desired continuous audio signal. In response to pressing a mute key on keypad 34, a signal from IR receiver 65 causes CPU 67 to activate one of the two control lines on the muart 37, labelled F. This in turn opens a switch disconnecting the continuous audio from the output of switch 41. This results in the continuous audio to be disconnected from attennuator 42 thereby muting it.

Pressing the mute key once more deactives the control signal to switch 41 which results in unmuting of the continuous audio. Muart 37, which may be an Intel 8256 Multifunction Universal Asynchronous Receiver Transmitter LSI, provides the serial I/O interface to the modem 36. In addition, two of the parallel lines labelled F are used to control the mute and background audio select switches in the switch 41. The selected channel out of audio select switches in the switch 41. The selected channel out of switch 41 is applied to attennuator 42. This block is a programmable gain amplifier whose gain is reduced by approximately 12 dB when the control signal D from audio control 43 is activated. This control signal is generated by audio control 43 when the last audio frame has been stored into the audio 50. The audio control 43 can determine this condition based on the data in the line 12 in VBI. As soon as the audio control detects this condition it activates the control signal D and begins to play the contents of audio 50. The digitized audio samples from audio 50 are converted to analog audio by means of the combined audio D/A and LPF 51. This is the digital to analog converter and the filter block. This audio is then summed with the attenuated continuous audio in the summer 44. This is done so that the continuous audio, e.g. background music, does not obscure the video specific stored audio, e.g. speech. The output of the summer 44 is then applied to the audio input of the channel modulator 45 which couples it to the television set 35. The continuous audio is playing concurrently with the stored still image.

Each video and encoded audio frame received from the Central Facility 11 had been tagged with a three-byte terminal address and a two-bit mode code and a continuous audio channel selection code in line 12 of the vertical blanking interval (VBI). The VBI processing circuit 46 detects the line 12 and coordinates the actions of error detector 47, address register 49, mode/tag register 48 and spare register 74. Mode/tag register 48 is strobed to accept and store the mode code bits whereas spare register 74 is strobed to store the continuous audio selection code bits from the line 12 data. The error detector 47 indicates if any errors have been detected on the data on line 12. The VBI processing circuit 46 compares the contents of the address register 49 with the address bits on line 12. A matching condition indicates that the current frame is to be captured by this terminal. At the end of line 12 if the address matched and no transmission errors have been detected by the error detector 47 then CPU 67 receives an interrupt via the decoder interface 68 and the system bus 66. The CPU 67 then reads the contents of the mode/tag register 48 and the spare register 74 by means of the CPU interface block. The CPU 67, based on the contents of the spare register 74 is then able to select the appropriate continuous audio channel in response to the control signal from muart 37. The mode code can have one or four meanings:
Video frame;
Video frame; stop preceding audio
Audio playout; initial frame
Audio playout; continuation frame.

The vertical and horizontal drives are used to identify all frame lines by number. Line 12 is read out and the address and mode (video or audio) bits are connected over to the VBI processor 46, a mode/tag register 48 and error detector 47. The address is correlated with the user address which is resident in address register 49, and then the mode bits are checked to determine the type of frame, so that appropriate action can be taken. Each frame transmitted from the Central Facility is tagged with numbers that repeat in 64 blocks. This sequence of numbers are the 6 tag bits in the mode/tag register. These can be interrogated by the Central Facility to check the delivery of any specific still frame recently transmitted.

If the address in line 12 correlates with the terminal ID, then depending upon the mode (video or audio), the frame is inserted into the appropriate store. In the case of audio, they are stored in bursts (line-by-line) of 5.7272 Mb/s and clocked into audio RAM 50, line-by-line through the appropriate set of frames.

After the audio data segment has been received, it is played out from the RAM 50 at the appropriate speed (e.g., 128 kb/s) through D/A converter 51 which includes a 7.5 KHz low pass filter. The analog output from the D/A converter is passed to the sound summer 44 which connects into the audio input of the channel 3 modulator 45. It is summed with the selected continuous audio channel which is attenuated until the sequence is completed.

The video frames from demodulator 38 are connected, via a dc restorer 52, to a color subcarrier (3.58 MHz) band-pass filter 53. Its output is passed on to a color-subcarrier regenerator chip 54. For this to operate, it is necessary for it to be provided with a burst flag gate. To achieve this, the synchronization pulses are stripped off the incoming video frames by sync stripper 55 and connected into a synchronization pulse generator 56. The outputs from generator 56 include horizontal drive, vertical drive, and color subcarrier burst flag. All clocking frequencies for synchronization are derived from the color subcarrier bursts always present on the incoming still frames. For sync generator 56 to operate, it needs an input of four times the color subcarrier frequency (14.32 MHz). This is provided by a phase-locked loop 57. The output of the regenerated color subcarrier frequency is connected into the phase-locked loop which locks in a 8 times color subcarrier oscillator from which the 4 times color subcarrier is derived.

The dc restored frames from DC restorer 52 are connected to a buffer which generates TTL logic levels from the bits on the raster. These are connected into the clock generator and data extraction circuit 59. This data extraction makes efficient use of the raster frames.

The leading edges of the horizontal synchronization pulses slope too much to accurately synchronize the bit train. Accordingly, a bit synchronization circuit is used. It will be recalled that the first bit on each data line is a "1," placed 10.5 microseconds (60 data clock pulses after the leading edge of the horizontal sync pulse. This is called a flag bit. The 8 times color subcarrier source is connected to clock 59 which divides by 5 to derive 174.6 nanosecond data clock pulses. The leading edges of the horizontal synchronization pulses are used to start a count using the data clock 59. Turning now to FIG. 4, after a count of 58 data clock pulses (10.127 microseconds) a gate or time window is opened for the 8 times color subcarrier clock (28.64 MHz) for a period of 5 data clock pulses (873 ns). These 5 data clock pulses are "and"ed with the data bit stream so that when the leading "1" (e.g., flag bit) is present, its position with respect to the five data clock pulses is identified and is used to correctly synchronize the data clock to the rest of the data on the line.

Returning now to FIG. 5, a flash A/D converter 60A, part of video coder 60, clocked at about 14.32 million 8-bit samples per second, continually provides data into input register 61, but it is not transferred into memory bank 62 (3.82 Mb) until a strobe is received. If the mode register 48 recognizes the incoming frame as being addressed to the user terminal and being for video display, a strobe is sent to the video frame store. The memory bank 62 is then loaded from register 61 for the period of exactly one frame (approx. 1/30 second.) It is then played out as still frame through D/A converter 60B repetitively using the 4 times color subcarrier clock (14.32 MHz). Since there is a color subcarrier phase jump between every other frame, this is corrected in the frame jump correction block 63.

Before being connected into the video input of the modulator 45, the video signal is passed through a character generator 64. This is used to insert characters as they are entered from the user keypad 34. They are typically inserted close to the bottom of the screen display.

The system provides interactive data retrieval and transaction. The infra-red keypad 34 provided with the system is equipped with an adequate number of keys (e.g., 53) to interact with the system, including alphanumeric and various special function keys to provide simplified, dedicated operation of on/off, page forward, page back, pause, purchase and other functions.

The keypad 46 transmits PCM-encoded IR commands to the set-top module via an infra-red receiver 65. The keypad is the mechanism for the user to control the set-top module and to communicate with the Central Facility 11 via the telephone loop 14. The keys are used to control the terminal, Central Facility functions, as well as to input transaction specific data by the users.

IR receiver 65 includes a decoder to convert the special encoded IR pulses into a convenient form for inserting onto the 8085 CPU bus 66.

Data communications with the Central Facility 11 may be provided by modem 36 that transfers asynchronous ASCII data at a rate of 300 or 1200 bps via a telephone switching office. Modem 36 has autodial capability for automatic placement of calls to the Central Facility. LED indicator 74 is a data carrier detector.

The terminal is controlled by microprocessor 67 coupled to system bus 66. A 8085 CPU may be used. MUART 36 is connected to system bus 66.

Decoder interface 68 is used as a buffer between the bus 66 and the circuits associated with the line 12 data. Address decoder 69 is adapted to the 8085 bus 66. The program firmware is stored in EPROM 70. EEPROM 71 is used to store information from Central Facility 11 via the telephone connection 14. Examples of these are the terminal address, passwords, and display characters used before a connection is established.

EEPROM 71 also provides storage of banners and messages for display, and also terminal identification (serial number) and terminal type (version number) for use in the Log-on process. Messages that are stored in EEPROM include the following:

Call being placed
Call completed
Call attempt failure
Video channel failure
IVS session ended
Call disconnected.

Data for these prestored messages can also be downloaded to the terminal over the telephone loop 14 from the Central Facility 11.

Terminal 12 has the capability to receive ASCII text over the telephone line 14 or retrieve it from the EEPROM and switch it onto the video frame currently being displayed. A blank frame generated by sync generator 56 allows display of only the ASCII text. The video character generator 64 produces characters for display on the screen.

When the terminal is in the "off" state, only the infrared receiver is powered. In this state, the set-top module is totally transparent to the TV signal. This transparency is provided by a switch 73 that connects incoming signals to the television set 35 with all set-top module components disconnected.

When the Terminal 12 is turned on, the locally stored banner is displayed on the screen and the terminal modem auto-dials the Central Facility 11. When the Concentrator Subsystem 15 detects the power-up message (which is sent by the Terminal 12 once carrier is detected on the telephone loop 14), it sends a prompt to the Terminal 12 to transmit its identification number. The Concentrator Subsystem 15 then sends a message to the Server to establish a new session.

In one mode of operation, in order to control service use by subscription only, the Server Subsystem 16 sends a log-on form to the terminal 12, and the user ID and Password keyed in by the subscriber are verified against the database. Should the user ID or Password be invalid, the appropriate error message is sent by the Server Subsystem 16. The user is allowed two input errors but if there is still an error on the third attempt, the session is terminated by the Server Subsystem 16 on the assumption that the access is being attempted by an unauthorized user. The carrier signal on the telephone loop 14 is dropped and the Terminal 12 becomes disconnected from the system. When valid ID and Password have been received by the Server Subsystem 16, a confirmation message is sent to the Concentrator Subsystem 15, which in turn sends a "session start-up" message to the Video Subsystem 17.

As part of the subscriber profile in the Server Subsystem database, there is the CATV channel number to which the terminal is tuned and this information is passed to the Video Subsystem 17 as part of the "session start-up" message. The Video Subsystem 17 selects the initial video frame (with associated audio frames as required) from storage as instructed by the Server System 16. The Video Subsystem 17 selects an available time slot on the appropriate channel and sends the selected frame(s) each with the terminal address encoded in line 12 of the VBI. A "start-up response" message is sent from the Video Subsystem to the Concentrator to complete the log-on procedure.

After viewing the initial screen (e.g., a main menu), the Terminal user indicates his next request via one or more keystrokes on the remote keypad. These keystrokes are transmitted over the telephone loop 14 and interpreted by the Concentrator Subsystem 15. The Concentrator System 15 then generates and sends to the Server Subsystem 16 a Video/Audio Processing (VAP) message. The Server Subsystem 16 uses this information to search its database to find the identities of the information frames that will satisfy the subscriber's request. This information is returned to the Concentrator Subsystem 15 in a two-part message. The first part, called the Page Control Record, contains information pertaining to any prompt or cursor controls that must be sent to Terminal 12 via telephone loop 14. This information is retained by the Concentrator Subsystem 15. The second part, called the Page Display Record, contains information concerning the frames to be sent (single frame or timed sequence, identities of all video and audio frames), and this is passed on to the Video Subsystem 17. The Video Subsystem 17 uses the PDR to access the Video Subsystem database and retrieve the requested frames from storage. The frames are then transmitted in sequence to the terminal during a selected available time slot via the CATV link 13.

Processing of the subscriber's requests continues in the manner described above until a log-off message is received by the Concentrator Subsystem 15 which in response sends a disconnect message to both the Server Subsystem 16 and the Video Subsystem 17. The Video Subsystem 17 sends appropriate information regarding the session to the Control and Maintenance Subsystem 18, and deallocates all data structures used in the session.

The use of both a CATV (or equivalent distribution system) and a telephone loop 14 to interconnect the Central Facility 11 and the Terminal 12 allows the addition of more sophisticated interfaces with the system. One such application is the inclusion of a Customer Service Representative (CSR). The subscriber who decides he needs some assistance while in the middle of a session can use either standard telephone calling features or the services of the Concentrator Subsystem 15 to put the connection "on hold" and make a telephone connection to a CSR. The CSR (through a second terminal) would then have the ability to control the user's session, i.e., control what is sent to the terminal 12, while talking to the user over the telephone loop 14. At the end of the consultation, the CSR would drop from the connection, returning control to the user.

What is believed to be the preferred embodiment and best mode of practicing the invention has been described. Other embodiments and modifications will, however, be apparent to those skilled in the art. Therefore, the scope of the invention is to be determined by the claims.

What is claimed is:

1. A telecommunication system for transmitting video and plural audio information on a transmission medium comprised of a facility and an addressable terminal,
   wherein said facility includes:
   means for providing addressed video frames containing information corresponding to still images;
   means for providing non-addressed signals containing information corresponding to at least two continuous audio channels;
   means for inserting a continuous audio channel selection code in one or more of said frames;
   means to couple said addressed video frames, and non-addressed signals to said transmission medium,
   wherein said addressable terminal includes:
   means for detecting said addressed video frames, and non-addressed signals on said transmission medium;
   means for selecting video frames in response to their corresponding addresses;
   means for selecting one of said continuous audio channels contained by said non-addressed signals in response to said continuous audio channel selection code;
   means for storing and playing still images from said video frames; and
   means for playing the selected continuous audio channel concurrently with said still images.

2. The telecommunication system of claim 1 wherein said continuous audio channel selection code is inserted into each frame.

3. A telecommunication system for transmitting video and plural audio information on a transmission medium comprised of a facility and an addressable terminal,
   wherein said facility includes:
   means for providing addressed video frames containing information corresponding to still images;
   means for providing addressed audio frames containing information corresponding to audio bursts;
   means for providing non-addressed signals containing information corresponding to at least two continuous audio channels;
   means for inserting a continuous audio channel selection code in one or more of said frames;
   means to couple said addressed video frames, said addressed audio frames, and non-addressed signals to said transmission medium,
   wherein said addressable terminal includes:
   means for detecting said addressed video frames, addressed audio frames, and non-addressed signals on said transmission medium;
   means for selecting video frames and audio frames in response to their corresponding addresses;
   means for selecting one of said continuous audio channels contained by said non-addressed signals in response to said continuous audio channel selection code;
   means for storing and playing still images from said video frames; and
   means for playing the selected continuous audio channel concurrently with said still images.

4. The telecommunication system of claim 3 wherein said continuous audio channel selection code is inserted into each frame.

* * * * *